Figure 5:
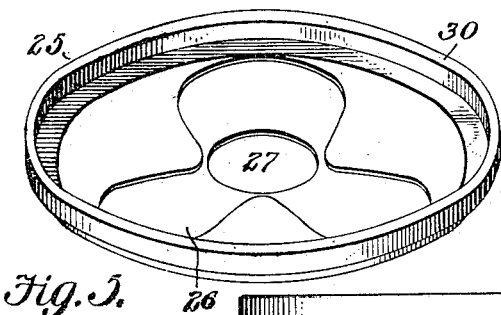

No. 830,057. PATENTED SEPT. 4, 1906.
C. G. DREW.
GLASS MOLD.
APPLICATION FILED DEC. 12, 1905.

3 SHEETS—SHEET 1.

WITNESSES: Curtis G. Drew, INVENTOR
By C. A. Snow & Co.
ATTORNEYS

No. 830,057. PATENTED SEPT. 4, 1906.
C. G. DREW.
GLASS MOLD.
APPLICATION FILED DEC. 12, 1905.
3 SHEETS—SHEET 2.
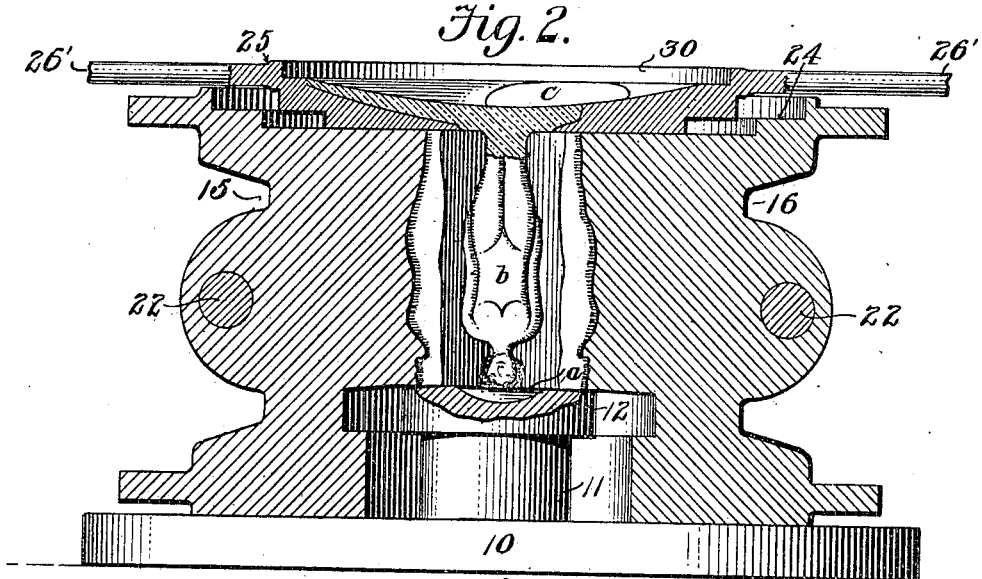
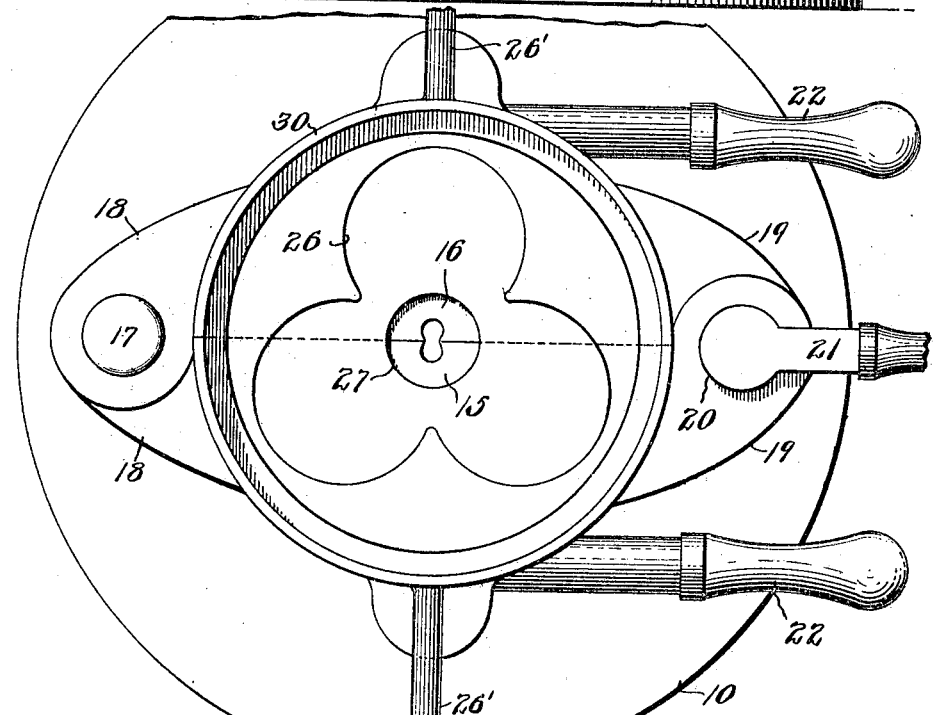
WITNESSES:
Curtis G. Drew,
INVENTOR.
By
ATTORNEYS No. 830,057. PATENTED SEPT. 4, 1906.
C. G. DREW.
GLASS MOLD.
APPLICATION FILED DEC. 12, 1905.
3 SHEETS—SHEET 3.
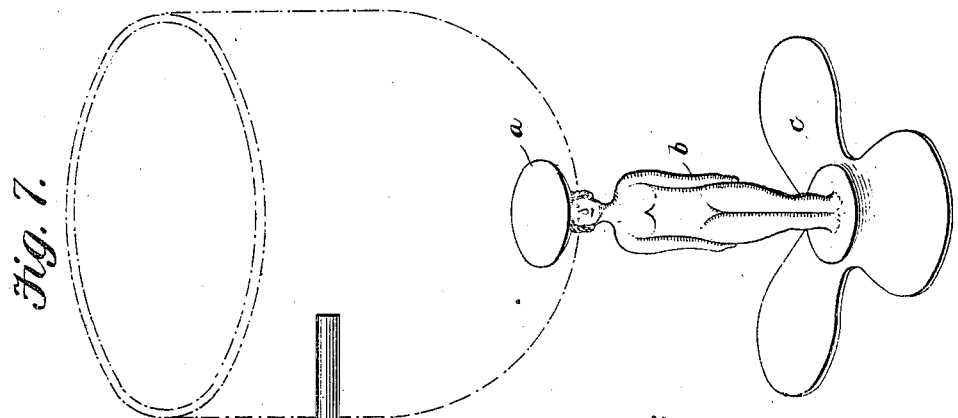
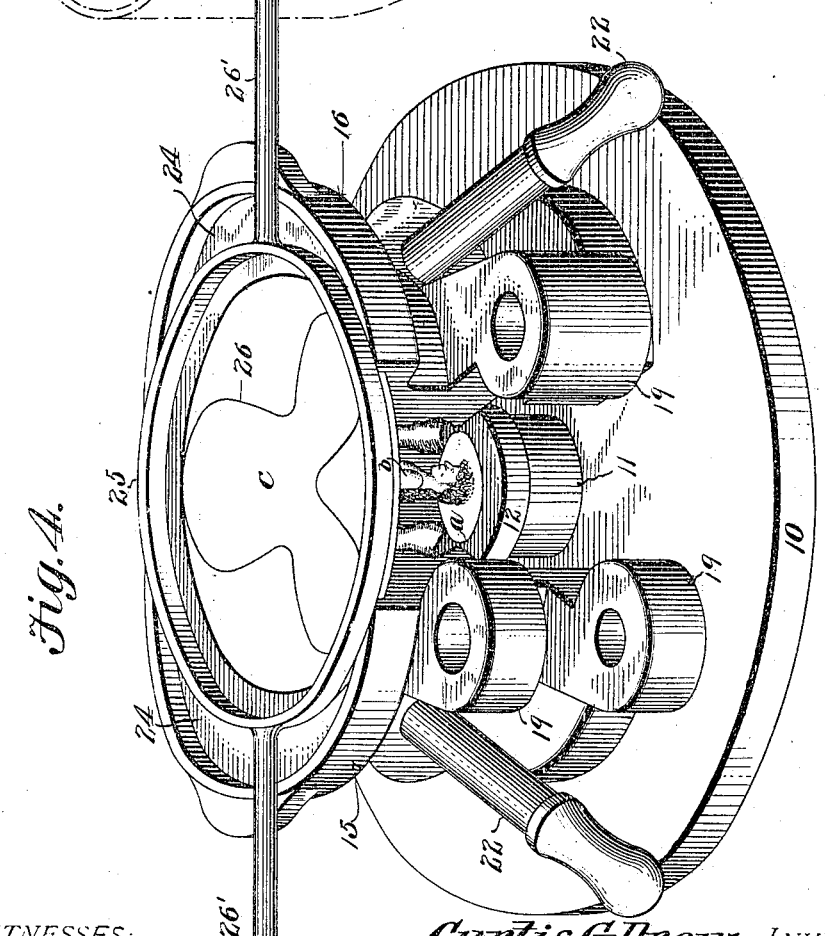
WITNESSES:
Curtis G. Drew, INVENTOR.
By
ATTORNEYS

UNITED STATES PATENT OFFICE.

CURTIS G. DREW, OF TIFFIN, OHIO.

GLASS-MOLD.

No. 830,057.  Specification of Letters Patent.  Patented Sept. 4, 1906.

Application filed December 12, 1905. Serial No. 291,461.

*To all whom it may concern:*

Be it known that I, CURTIS G. DREW, a citizen of the United States, residing at Tiffin, in the county of Seneca and State of Ohio, have invented a new and useful Glass-Mold, of which the following is a specification.

This invention relates to the manufacture of the stems and base portions of goblets and other articles of glassware, and has for one of its objects to provide an improved means whereby integral stems and bases may be formed of pressed glass without the appearance of any fins or ridges in the completed article, this being a defect common to all molded articles of glassware in which sectional molds are employed.

A further object of the invention is to provide an improved mold for making stem-ware in which the surfaces of the glass at an angle to each other—as, for instance, the base and stem of a goblet—may be provided with any desired ornamentation either in cameo or in intaglio.

A still further object of the invention is to provide an improved mold wherein the integral stems and bases of goblets or other articles may be pressed and finished at a single operation and in which the base or the stem, or both, may be of any required contour or may be provided with any desired surface ornamentation.

A still further object of the invention is to provide a press-mold in which one of the mold members serves as a pallet for conveying the finished article from the mold, thus adding to the speed of production and minimizing the danger of breakage or marring of the glass while still in a comparatively soft or plastic condition.

A still further object of the invention is to provide a sectional mold for the manufacture of articles having integral stems and bases—such, for instance, as goblets or stands in which the mold for the base member is in the form of a continuous unbroken ring, so that there can be no possibility of the formation of fins or ridges, such as ordinarily occur where the mold is in sections.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 6:
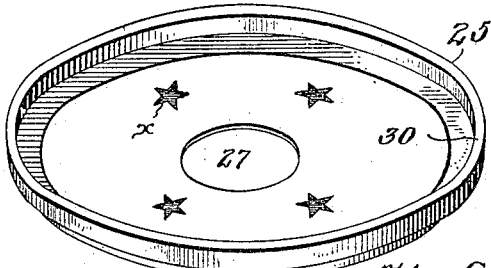
Figure 1:
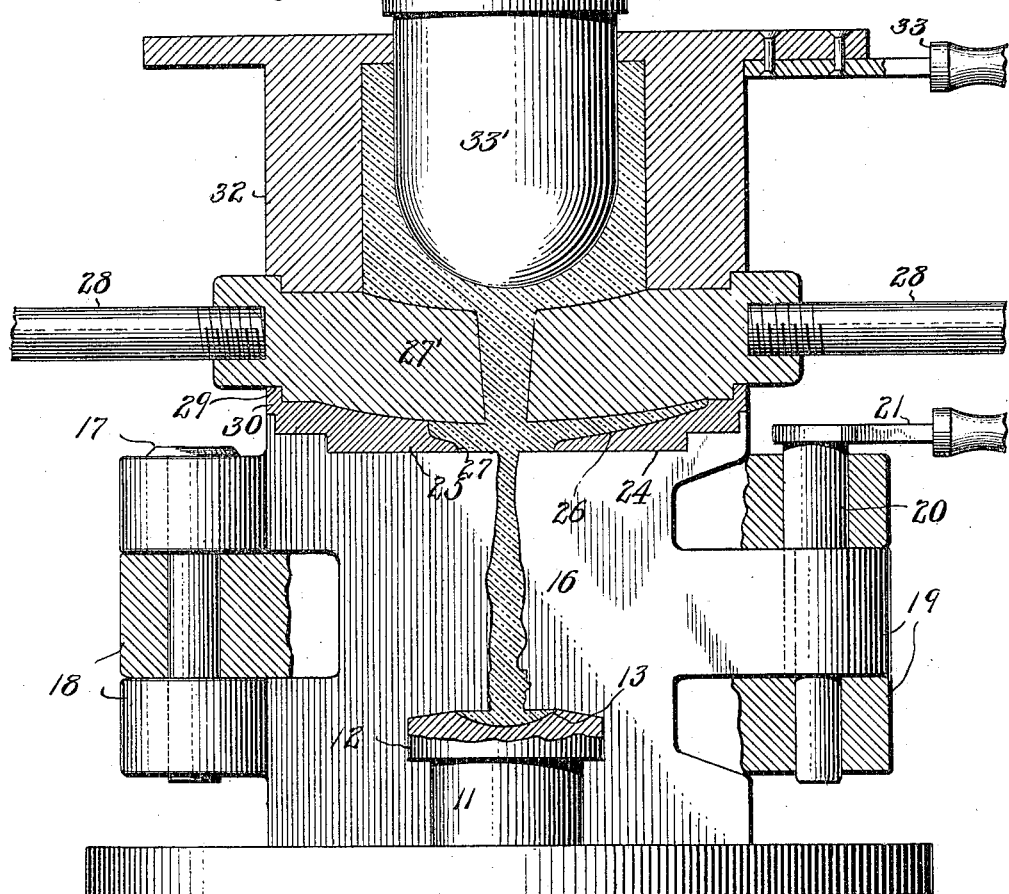

In the accompanying drawings, Figure 1 is a sectional elevation of a glass mold or press constructed in accordance with the invention, the parts of the mold being closed and the plunger being shown in the act of forcing the glass into the mold. Fig. 2 is a sectional elevation of the mold, the view being in a plane at a right angle to that shown in Fig. 1 and the parts of the mold being shown as partly opened to permit the removal of the article. Fig. 3 is a plan view of the mold with the upper mold-section detached. Fig. 4 is a detail perspective view of the parts shown in Fig. 2 with the molded article still in position within the mold. Fig. 5 is a detail perspective view of the combined molding-ring and pallet on which the base of the article is shaped. Fig. 6 is a similar view illustrating a slight modification of the molding-ring and pallet. Fig. 7 is a detail perspective view of the finished article, showing in dotted lines the addition of a blown-glass bowl or globe.

Similar characters of reference are employed to indicate corresponding parts throughout the several figures of the drawings.

The mold or press is provided with a suitable base 10, generally in the form of a disk and provided at its center with a vertically-disposed stem 11, at the top of which is a head or disk 12, that is provided with a dished recess 13 to receive that portion of the glass which is subsequently united to the bottom of the bowl or globe to form the finished article, as shown at *a* in Fig. 7. Mounted on the base 10 and free for movement thereon is a pair of mold or press members 15 16, each of which is semicircular in form, the division-line extending diametrically across the complete mold. These sections are connected at one side by a pintle 17, passing through openings formed in suitable lugs 18, projecting from the sections, and at the opposite side are arranged lugs 19, provided with suitable openings for the passage of a locking-pin 20. This pin is provided with eccentrics and is carried at the end of a suitable handle 21, so that it may be readily inserted in openings formed in the lugs and then turned so that its eccentrics may draw the sections of the mold tightly together prior to the admission of the glass. The mold-sections are provided with the usual handles 22, by which the mold is opened for the removal of the article after each operation.

The mold-sections 15 and 16 are provided with recessed molding-faces of any desired shape in order to form the stems $b$, and as a rule the slight fin or ridge formed at the opposite sides of the stem at the juncture of the mold-sections will not be noticeable, especially where the stem is of an ornamental character or where it is angular in cross-section, and mold blemishes of this portion of the article are not noticeable as a rule, and therefore are not usually objectionable.

In the formation of the base portions of goblets, stands, and other articles the presence of the mold fins or ridge materially detracts from the appearance of such articles, and in the ordinary method of manufacture employed in the majority of glass-houses at the present time it is usual to mold the stem with a mass of glass attached at one end, this mass being usually cup-shaped in form and being afterward reheated and pressed out into disk form by the employment of hand-tools. This adds considerably to the cost of manufacture of the articles, and there is lack of uniformity, owing to the difficulty of gaging the precise quantity of glass in the disk or determining the exact diameter of the base during such hand manufacture.

In carrying out the present invention the upper portion of each of the mold-sections 15 and 16 is provided with a recess 24. These recesses are designed for the reception of a combined mold member and pallet 25, that is generally in the form of a complete ring, although its contour may be altered in accordance with the character of the base to be made.

In the present instance the base C is shown as trefoil in outline, and the molding-ring and pallet 25 is provided with mold-recesses 26 for the formation of this particular type of base. These mold-recesses all extend through and communicate with a central aperture 27, which is in vertical alinement with the top of molding-recess formed in the sections 15 and 16, as will be evident on reference to Figs. 1 and 2, and when the metal is pressed into the mold the recesses 26 will be completely filled, and the base will be formed integral with its stem and will be completed at a single operation, so that when the mold-sections 15 and 16 are opened in the manner shown in Fig. 2 the article will be supported by the molding-ring and pallet 25, and the handles 26 of the latter may then be grasped in order to remove the finished article from the mold.

Above the mold end 25 is arranged the top section 27 of the mold, said top section forming the complementary portion of the mold which shapes the bottom of the base. This mold-section 27 is provided with suitable handles 28, which facilitate its removal, and its lower edge has an annular groove or recess 29, which receives an annular rib 30 at the periphery of the mold-ring and pallet 25 in order to properly assemble the parts.

The top of the mold-section 27 is recessed to receive the filling and pressure cylinder 32, which is also provided with a suitable handle 33 to facilitate its removal and readjustment to operative position. The cylinder 32 receives the compression-plunger 33', and in the operation of this portion of the mechanism, the plunger being retracted, a quantity of metal sufficient for the purpose is poured into the cylinder, after which the plunger is forced down and presses the metal into all parts of the mold.

In carrying out the invention the mold-sections 15 and 16 are closed, the pallet 25 having been placed in position in the recesses 24, and then the eccentric-pin 20 is introduced through the openings of the lugs 19 and the sections of the mold are drawn tightly together. The top section 27 and cylinder 32 are then placed in position, after which a predetermined quantity of metal is poured into the cylinder 32. The plunger 33 is then moved downward and forces the metal into all parts of the mold. The operator then grasps the handle 28 and lifts the top section 27 and cylinder 32 away from the lower portion of the mold, the plunger 33 being of course moved upward before this operation. It will be noticed that the opening or passage formed at the center of the top mold-section 27 is tapered in form with the smallest diameter at the bottom, and when this top section is lifted off the metal will be broken at its smallest diameter, being the bottom of the base of the article. This usually leaves a rough spot in the form of a small teat of glass which is pressed down and smoothed by a flatter, which may be of any desired type.

The mold-sections 15 and 16 are then opened, leaving the finished article suspended from the ring and pallet 25, the lower end of the article being partly supported by the head or flange 12. The operator then grasps the handles 26 and removes the ring mold and pallet 25, together with the finished article, so that no damage can occur through careless handling of the glass, nor can the article be mutilated or distorted through accidental contact with the tongs or similar instruments usually employed while the metal is still in a comparatively soft condition.

By the employment of the combined molding-ring and pallet 25 a number of very important advantages are gained. One of these, as heretofore pointed out, is the manufacture of the complete stem and base at a single operation, and another and very important advantage is that bases of any desired contour or possessing any desired surface ornamentation on either the top or bottom or edge may be made without any extra expense and, in fact, at a cost much less than that of the ordinary article now manufactured. The formation of a base of trefoil contour is illustrated in Fig. 7, and the mold-ring for pressing it is clearly shown in Fig. 5. In Fig. 6, which illustrates a slight modification of the mold-ring and pallet, is shown the ornamental die-faces $x$, which in the present case take the form of stars and are intended to be typical of either cameo or intaglio ornamentation to be formed on the top or upper face of the base portion of the article.

It has heretofore been considered impossible to produce such ornamentation during such molding or pressing operation, although it may be readily carried into effect by the apparatus which forms the subject of the present invention. It will be noted that while the molding-faces which shape the stem separate in a direction at a right angle to the base of the stem, and thereafter permit opening of the mold without danger of mutilation of an ornamental surface, the mold members by which the base is formed do not separate in the same direction as the main members, but one, the upper, is raised and the other, the member 25, is lowered, so that both of the base-forming members also separate in a direction at a right angle to the molded surface.

While the invention has been described as intended principally for the production of integral stems and bases for goblets, it will be understood that it may also be employed in the manufacture of any articles having base or bowl or disk members formed with an integral stem.

I claim—

1. In a mold or press for the formation of stem-ware having integral base and stem members, a sectional mold for shaping the stem and provided with recessed upper and lower faces, a continuous ring arranged within the upper recesses and forming a mold member for shaping the inner or exposed face of the base, said ring being supported by the sectional mold when the latter is opened and serving as a pallet for the removal of the finished article, and a stationary member fitting the lower recesses and serving to shape the lowermost end of the stem during the molding operation, said member serving further as a support for the stem when the movable sections of the mold are opened.

2. In a mold or press for the formation of stem-ware having integral base and stem members, a sectional mold for shaping the outer face of the stem and provided with recessed upper and lower faces, a continuous ring arranged within the upper recesses and forming a mold member for shaping the inner or exposed face of the base, a detachable upper member for shaping the bottom of the base and provided with a central opening, means for forcing the metal through said opening, and a stationary member serving to shape the lower end of the stem during the molding operation, said stationary member and the continuous ring forming supports for the article after the opening of the mold.

In testimony that I claim the foregoing as my own I have hereto affixed my signature in the presence of two witnesses.

CURTIS G. DREW.

Witnesses:
J. ROSS COLHOUN,
A. E. SQUIRE.